(12) United States Patent
Niezur et al.

(10) Patent No.: US 8,020,924 B2
(45) Date of Patent: Sep. 20, 2011

(54) INTEGRATED REINFORCING CROSSMEMBER

(75) Inventors: Michael C. Niezur, Madison Heights, MI (US); Taylor S. Robertson, Oxford, MI (US)

(73) Assignee: Sika Technology AG, Baar (CH)

( * ) Notice: Subject to any disclaimer, the term of this patent is extended or adjusted under 35 U.S.C. 154(b) by 535 days.

(21) Appl. No.: 11/964,257

(22) Filed: Dec. 26, 2007

(65) Prior Publication Data

US 2009/0167054 A1 Jul. 2, 2009

(51) Int. Cl.
B62D 21/02 (2006.01)

(52) U.S. Cl. ............... 296/187.02; 296/203.02; 296/205

(58) Field of Classification Search ............ 296/187.02, 296/187.09, 187.11, 187.12, 193.02, 193.05, 296/193.06, 193.08, 193.09, 203.01, 203.02, 296/203.03, 203.04, 205
See application file for complete search history.

(56) References Cited

U.S. PATENT DOCUMENTS

| | | |
|---|---|---|
| 6,131,897 A | 10/2000 | Barz et al. |
| 6,263,635 B1 | 7/2001 | Czaplicki |
| 6,296,298 B1 | 10/2001 | Barz |
| 6,311,452 B1 | 11/2001 | Barz et al. |
| 6,358,584 B1 | 3/2002 | Czaplicki |
| 6,419,305 B1 | 7/2002 | Larsen |
| 6,467,834 B1 * | 10/2002 | Barz et al. ............... 296/187.02 |
| 6,471,285 B1 | 10/2002 | Czaplicki et al. |
| 6,474,723 B2 | 11/2002 | Czaplicki et al. |
| 6,561,571 B1 | 5/2003 | Brennecke |
| 6,668,457 B1 | 12/2003 | Czaplicki |
| 6,729,425 B2 | 5/2004 | Schneider et al. |
| 6,777,049 B2 | 8/2004 | Sheldon et al. |
| 6,786,533 B2 | 9/2004 | Bock et al. |
| 6,793,274 B2 * | 9/2004 | Riley et al. ............... 296/187.03 |
| 6,880,657 B2 | 4/2005 | Schneider et al. |
| 6,883,858 B2 | 4/2005 | Barz |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,932,421 B2 | 8/2005 | Barz |
| 6,941,719 B2 | 9/2005 | Busseuil et al. |
| 6,953,219 B2 | 10/2005 | Lutz et al. |
| 7,025,409 B2 * | 4/2006 | Riley et al. ............... 296/187.03 |
| 7,077,460 B2 | 7/2006 | Czaplicki et al. |

(Continued)

FOREIGN PATENT DOCUMENTS

EP 1149679 A2 10/2001

(Continued)

OTHER PUBLICATIONS

PCT International Search Report for PCT/EP2008/068177.

*Primary Examiner* — Glenn Dayoan
*Assistant Examiner* — Gregory Blankenship
(74) *Attorney, Agent, or Firm* — Rader, Fishman & Grauer PLLC

(57) ABSTRACT

Some embodiments comprise an integrated reinforcing crossmember having a carrier with an expansible material adhered to at least a portion of the exterior surface of the carrier. The carrier is comprised of a center section and two end sections, each section comprised of external lateral walls and internal ribs joined by cross walls and horizontal connecting walls. The crossmember is inserted into a cavity of a corresponding structural member, and the expansible material is activated and expands, securing the crossmember in place within the cavity.

18 Claims, 9 Drawing Sheets

U.S. PATENT DOCUMENTS

| | | | |
|---|---|---|---|
| 7,105,112 B2 | 9/2006 | Czaplicki et al. | |
| 7,111,899 B2 | 9/2006 | Gray | |
| 7,114,763 B2 | 10/2006 | Riley et al. | |
| 7,144,071 B2 | 12/2006 | Le Gall et al. | |
| 7,194,804 B2 | 3/2007 | Czaplicki | |
| 7,255,388 B2 | 8/2007 | Le Gall et al. | |
| 7,296,847 B2 | 11/2007 | Czaplicki et al. | |
| 7,313,865 B2 | 1/2008 | Czaplicki et al. | |
| 7,374,219 B2 | 5/2008 | Brennecke | |
| 7,478,478 B2 | 1/2009 | Lutz et al. | |
| 7,479,246 B2 * | 1/2009 | Muteau et al. | 264/273 |
| 7,494,179 B2 | 2/2009 | Deachin et al. | |
| 7,503,620 B2 | 3/2009 | Brennecke et al. | |
| 2001/0017018 A1 | 8/2001 | Czaplicki | |
| 2002/0160130 A1 | 10/2002 | Sheldon et al. | |
| 2002/0174954 A1 | 11/2002 | Busseuil et al. | |
| 2003/0042056 A1 | 3/2003 | Schneider et al. | |
| 2003/0057737 A1 | 3/2003 | Bock et al. | |
| 2003/0090129 A1 | 5/2003 | Riley et al. | |
| 2003/0184121 A1 | 10/2003 | Czaplicki et al. | |
| 2003/0218019 A1 | 11/2003 | Le Gall et al. | |
| 2004/0046421 A1 | 3/2004 | Barz | |
| 2004/0084141 A1 | 5/2004 | Czaplicki | |
| 2004/0143969 A1 | 7/2004 | Czaplicki et al. | |
| 2004/0159481 A1 | 8/2004 | Schneider et al. | |
| 2004/0164588 A1 | 8/2004 | Lutz et al. | |
| 2004/0207233 A1 | 10/2004 | Bock et al. | |
| 2004/0212220 A1 | 10/2004 | Riley et al. | |
| 2004/0224108 A1 | 11/2004 | Sheldon et al. | |
| 2004/0227377 A1 | 11/2004 | Gray | |
| 2004/0256888 A1 | 12/2004 | Le Gall et al. | |
| 2005/0017543 A1 | 1/2005 | Riley et al. | |
| 2005/0040671 A1 | 2/2005 | Barz | |
| 2005/0212332 A1 * | 9/2005 | Sheldon et al. | 296/203.01 |
| 2005/0276970 A1 * | 12/2005 | Busseuil et al. | 428/343 |
| 2006/0006695 A1 | 1/2006 | Lutz et al. | |
| 2006/0008615 A1 * | 1/2006 | Muteau et al. | 428/116 |
| 2006/0061115 A1 | 3/2006 | Brennecke | |
| 2006/0267378 A1 * | 11/2006 | Czaplicki et al. | 296/187.02 |
| 2007/0045866 A1 | 3/2007 | Gray et al. | |
| 2007/0075569 A1 | 4/2007 | Barz et al. | |
| 2007/0090666 A1 | 4/2007 | Brennecke et al. | |
| 2007/0281523 A1 | 12/2007 | Riley | |
| 2008/0023987 A1 | 1/2008 | Schneider et al. | |
| 2008/0143143 A1 | 6/2008 | Brennecke | |
| 2008/0202674 A1 | 8/2008 | Schneider et al. | |
| 2008/0257491 A1 | 10/2008 | Czaplicki et al. | |
| 2009/0085379 A1 | 4/2009 | Takahashi et al. | |
| 2009/0108626 A1 | 4/2009 | Richardson et al. | |

FOREIGN PATENT DOCUMENTS

| | | |
|---|---|---|
| EP | 1609577 A1 | 12/2005 |
| EP | 1759964 A1 | 3/2007 |
| GB | 2375328 A | 11/2002 |
| WO | WO-03042024 A1 | 5/2003 |
| WO | WO-2007/082677 | 7/2007 |
| WO | WO-2008/110347 | 9/2008 |
| WO | WO-2009/049886 | 4/2009 |

* cited by examiner

INTEGRATED REINFORCING CROSSMEMBER

FIELD OF THE INVENTION

This invention relates to reinforcers for structural members.

BACKGROUND

Many products have bodies or housings that are comprised of metal structural members. As only some examples, automobiles, trucks, and other motor vehicles, as well as some consumer appliances, have metal structural members that form their respective bodies or housings as parts of the frame, underbody, or other locations. The metal structural members add torsional strength, resistance to crash impacts, and other desirable characteristics. However, their beneficial characteristics are often not without trade-offs in the form of additional weight or cost of the overall product.

To offset some of these trade-offs, many products have bodies or housings formed with hollow cavities therein. As only some examples, some structural members of automobiles, trucks, and other motor vehicles have a variety of orifices, hollow posts, cavities, passages, and openings (collectively, "hollow cavities") formed between inner and outer panels, in pillars, or within their frame members, that form their respective bodies or housings. Hollow cavities are often created in these products to reduce overall weight of the final product, as well as to reduce material costs. However, introduction of hollow cavities is itself often not without trade-offs. For example, introducing a hollow cavity may reduce the overall strength or energy-absorbing characteristics of a structural member. In addition, a hollow cavity may result in increased transmission of vibration or sound to other portions of the product.

It is known to use structural reinforcers as a complement or substitute for metal structural members to attempt to offset these and other tradeoffs. Some current reinforcers include an expansible material applied to a carrier, which typically is a molded component. The expansible material is expanded during the manufacture of the product, securing the reinforcer in place as the expanded material contacts the adjoining surface of the product. However, the expansible material in such reinforcers may not be securely joined to the carrier, leading to uneven or inadequate sealing. Moreover, expansion of the material may exacerbate the accumulation of fluids in the hollow cavity during production or ultimate use of the product, leading to corrosion or other undesirable effects. In addition, the structural reinforcer may not have features that permit ease and accuracy of use, especially in an automated assembly environment.

Thus, a significant need remains for an improved structural reinforcer that alleviates these and other drawbacks.

BRIEF DESCRIPTION OF THE DRAWINGS

The present invention will now be described, by way of example, with reference to the accompanying drawings, in which.

Other aspects of the invention will be apparent to those skilled in the art after reviewing the drawings and the detailed description below.

DETAILED DESCRIPTION

Without limiting the invention to only embodiments described herein and without disclaiming other embodiments, some embodiments comprise an integrated reinforcing crossmember having a carrier with an expansible material adhered to at least a portion of the exterior surface of the carrier. The carrier is comprised of a center section and two end sections, each section comprised of external lateral walls and internal ribs joined by cross walls and horizontal connecting walls. In some embodiments, the end sections are arcuate, serpentine, or modified "S"-shaped in order to accommodate the shape of the structural member to be reinforced. The crossmember is inserted into place in a cavity of a corresponding structural member, the crossmember having a shape that corresponds to at least a portion of the internal surface of the cavity and at least a portion of the expansible material opposing an internal surface of the cavity. The expansible material is heated and expands upon heating, further contacting the opposing internal surface of the cavity and securing the crossmember in place within the cavity.

Figure 1:
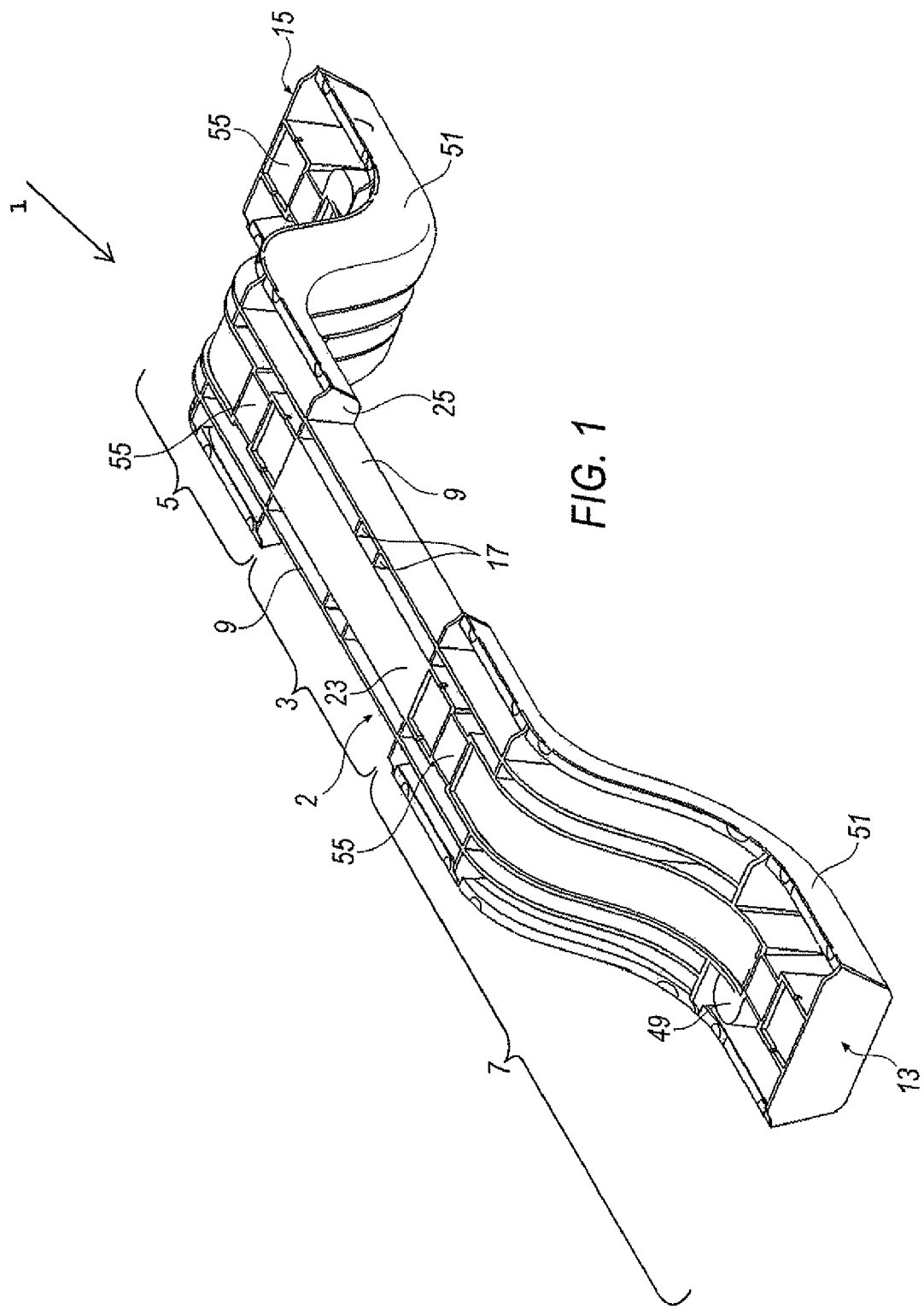
FIG. 1 is an angled top perspective of an integrated reinforcing crossmember according to one embodiment.

As shown in FIG. 1, in some embodiments, without limitation, an integrated reinforcing member 1 is comprised of three sections: a center section 3 and two end sections 5 and 7, each end section being joined to the center section 3. In this embodiment, end sections 5 and 7 are substantially similar in order to facilitate un-handed and error-proof use and installation of the crossmember.

Figure 2:
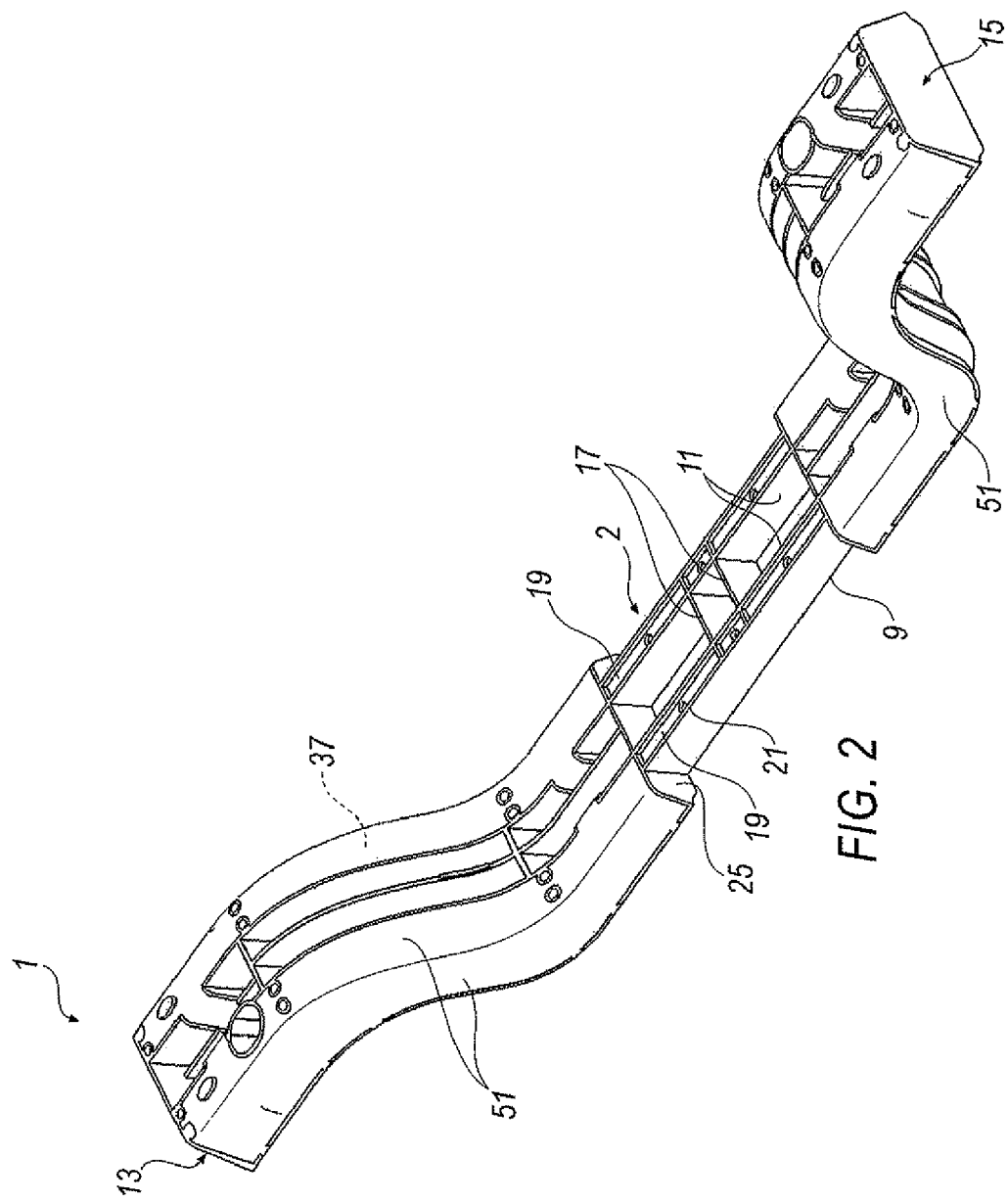
FIG. 2 is an angled bottom perspective of an integrated reinforcing crossmember according to one embodiment.

As shown in FIGS. 1 and 2, center section 3 is comprised of a carrier 2 with at least two external lateral walls 9 and at least two internal ribs 11 running generally in the direction of the longitudinal axis between ends 13 and 15 of crossmember 1. The walls 9 and internal ribs 11 are intersected and joined by a plurality of cross walls 17 running cross-sectionally across the crossmember in relation to its longitudinal axis. As shown in FIG. 2, respective pairs of an outer wall 9 and its most adjacent internal rib 11 are further connected at the bottom by a first horizontal connecting wall 19, forming a compartment comprised of an outer wall 9, an inner rib 11, and a first horizontal connecting wall 19. Each first horizontal connecting wall 19 may optionally have one or more drain holes 21 to permit egress of liquid from the chamber during the assembly process. In similar fashion, as shown in FIG. 1, respective pairs of adjacent internal ribs 11 are connected at the top by a second horizontal connecting wall 23, forming a compartment comprised of two internal ribs 11 and a second horizontal connecting wall 23. However, because it is at the top, second horizontal connecting wall 23 generally requires no drain holes 21, although they may be included at the discretion of the user.

Figure 3:
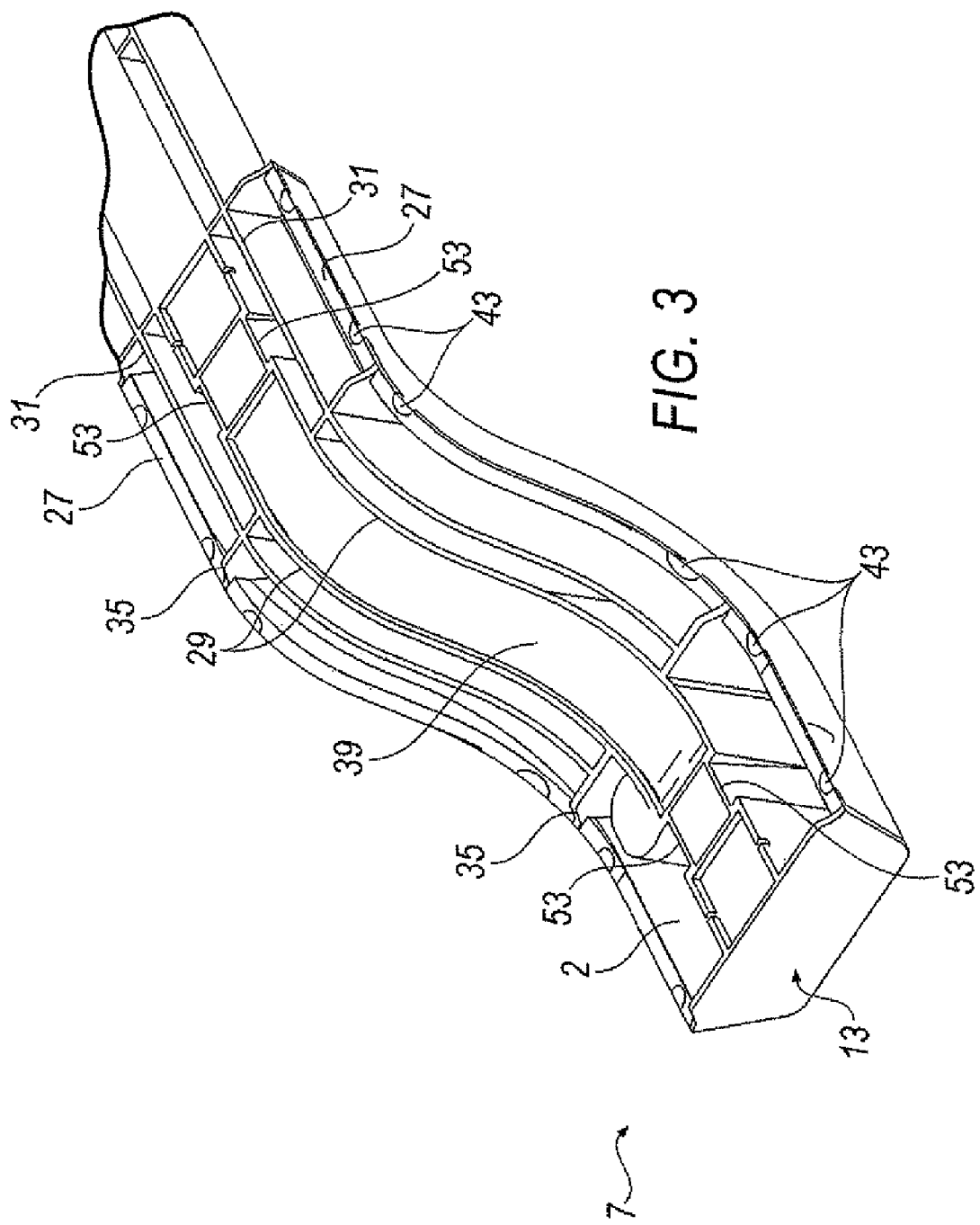
FIG. 3 is an angled partial top perspective of one end of an integrated reinforcing crossmember according to one embodiment.
Figure 4:
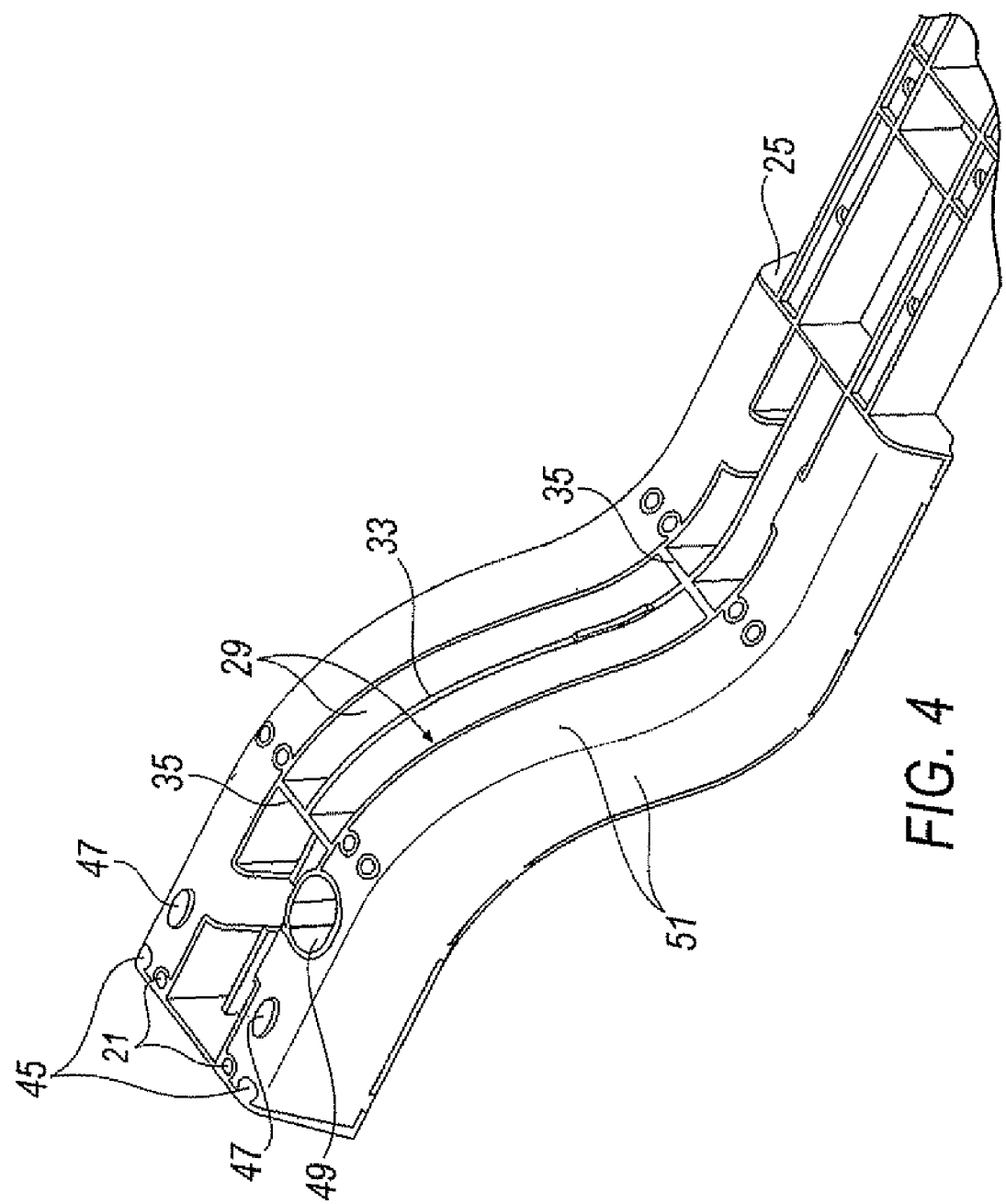
FIG. 4 is an angled partial bottom perspective of one end of an integrated reinforcing crossmember according to one embodiment.
Figure 5:
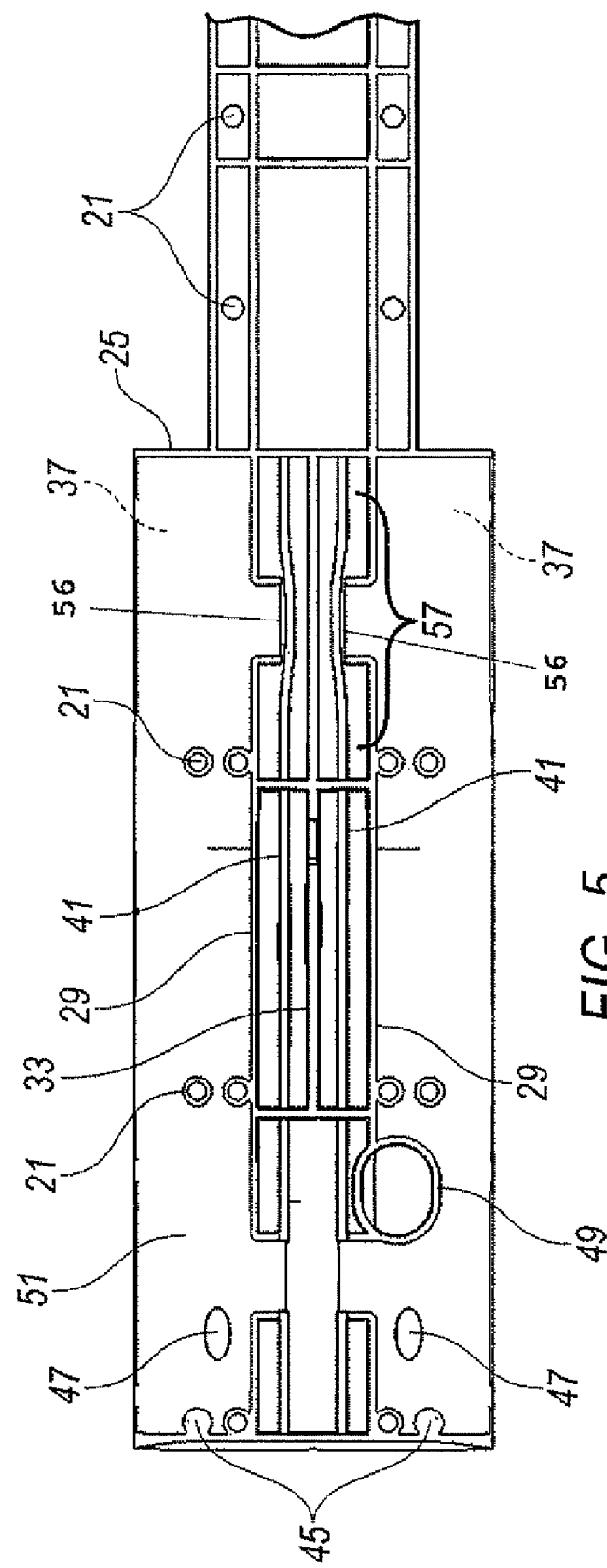
FIG. 5 is a partial bottom view of one end of an integrated reinforcing crossmember according to one embodiment.
Figure 6:
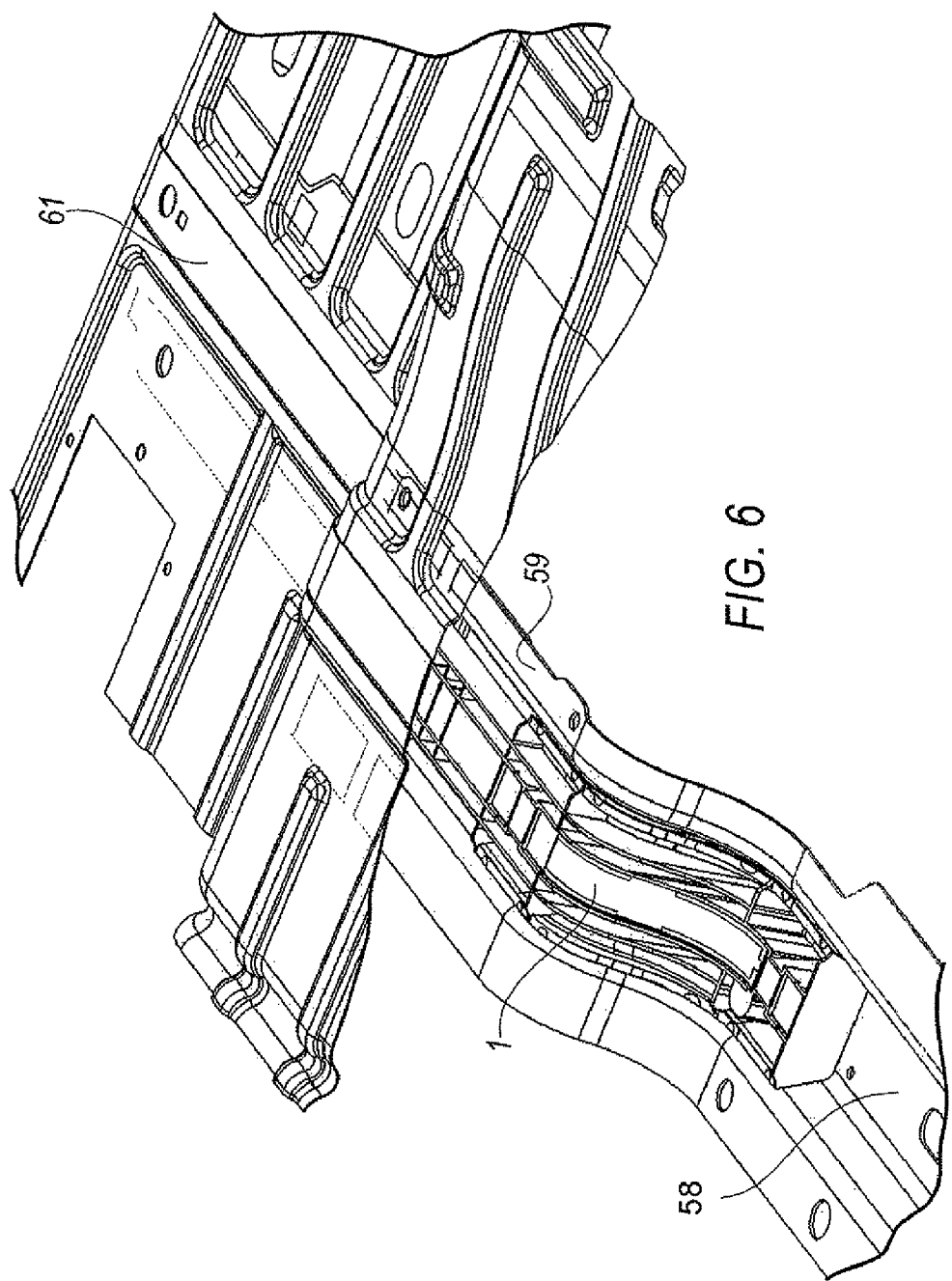
FIG. 6 is an angled partial top cutaway view of a motor vehicle floor pan, showing a partial view of one end of an integrated reinforcing crossmember according to one embodiment, as installed in a motor vehicle.
Figure 7:
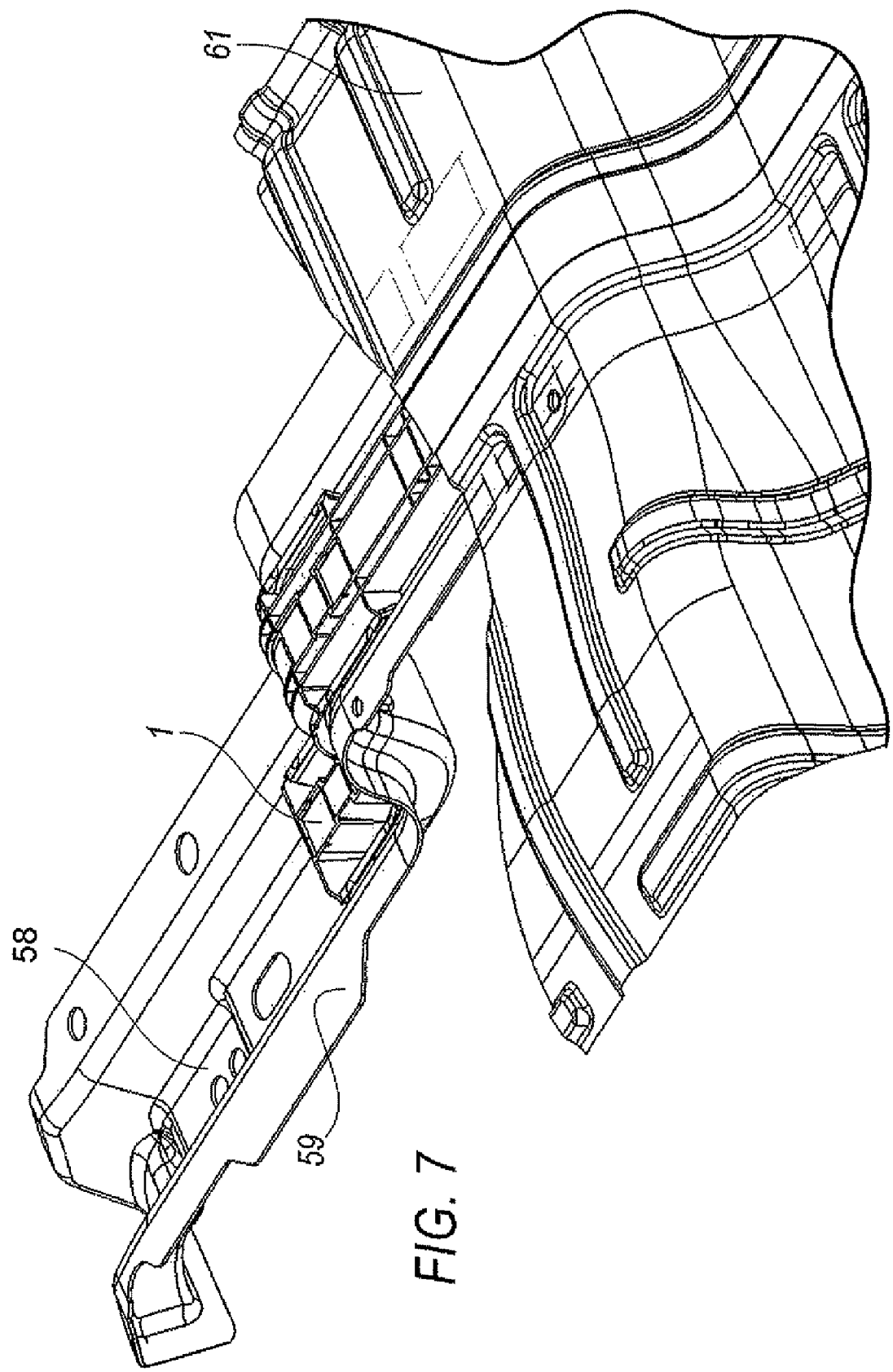
FIG. 7 is another angled partial top cutaway view of a motor vehicle floor pan, showing a partial view of one end of an integrated reinforcing crossmember according to one embodiment, as installed in a motor vehicle.
Figure 8:
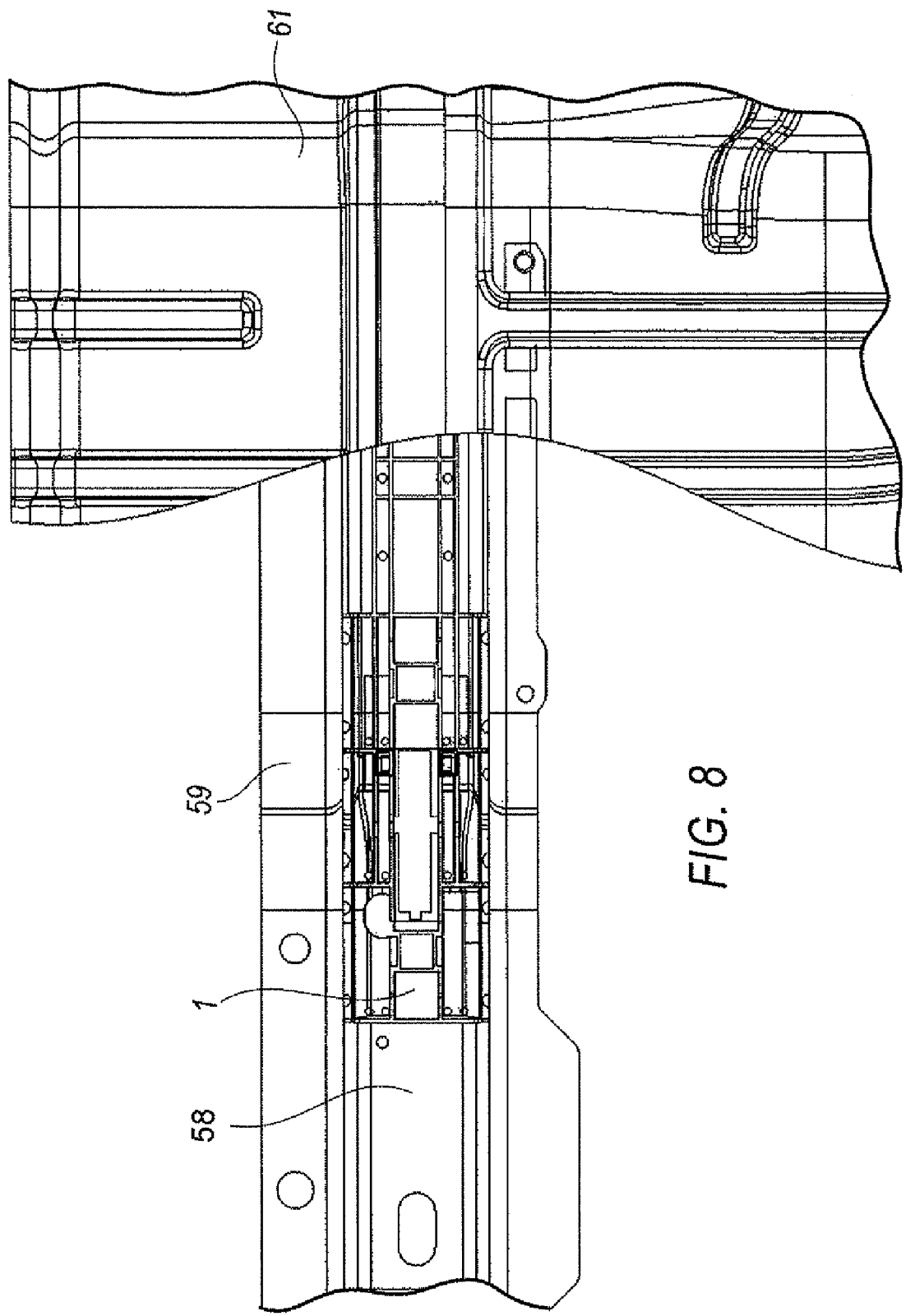
FIG. 8 is a top partial cutaway view of a motor vehicle floor pan, showing a partial view of one end of an integrated reinforcing crossmember according to one embodiment, as installed in a motor vehicle.
Figure 9:
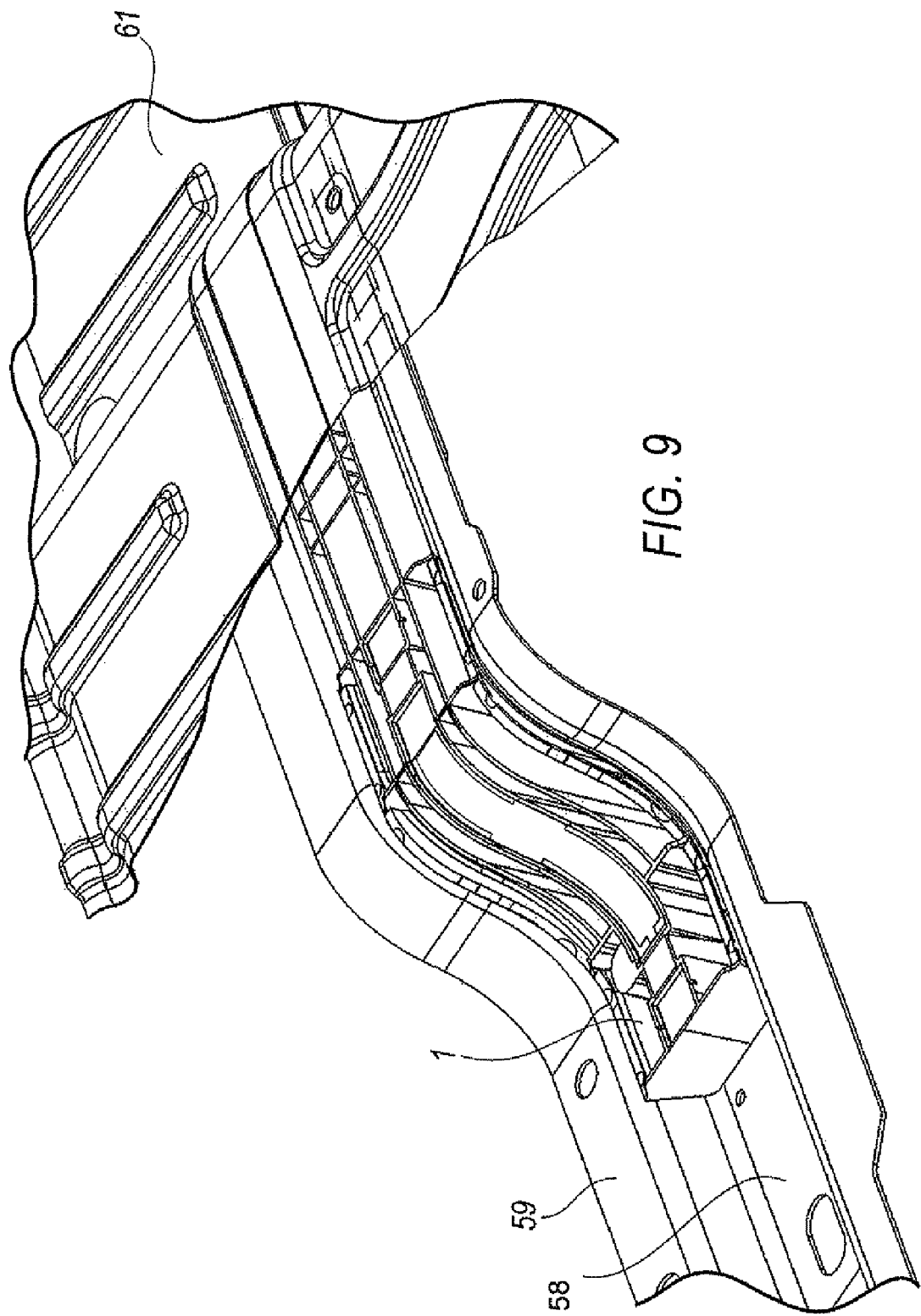
FIG. 9 is another angled partial top cutaway view of a motor vehicle floor pan, showing a partial view of one end of an integrated reinforcing crossmember according to one embodiment, as installed in a motor vehicle.

Center section 3 joins end sections 5 and 7 of crossmember 1 at cross walls 25. An exemplary end section is shown in FIGS. 3-5; however, it should be understood that embodiments of the invention are not limited to only those where the end sections are substantially similar. End section 7 is comprised of a carrier 2 having at least two external lateral walls 27, at least two internal ribs 29, at least one first center rib 31 disposed between an external lateral wall 27 and an internal rib 29, and at least one second center rib 33 disposed between two internal ribs 29. Walls 27, internal ribs 29, and center ribs 31, 33 run generally in the direction of the longitudinal axis of the crossmember 1 from end 13 to end 15. Walls 27, internal ribs 29, and center ribs 31, 33 are intersected and joined by a plurality of cross walls 35 running cross-sectionally across the crossmember. As shown in the embodiment of FIGS. 3-5, each external lateral wall 27, its most adjacent internal rib 29, and their adjacent first center rib 31 are further connected at the bottom by a third horizontal connecting wall 37, forming a compartment. Each third horizontal wall 37 may optionally have one or more drain holes 21 to permit egress of liquid from the compartment during the assembly process. In similar fashion, internal ribs 29 and second center rib 33 are connected at the top by a fourth horizontal connecting wall 39, forming a compartment. However, because it is at the top, fourth horizontal connecting wall 39 generally requires no drain holes 21, although they may be included at the discretion of the user. Optionally end section 5 may also comprise support ribs 41 which also run longitudinally and are disposed in the compartment formed by internal ribs 29, second center rib 33, and fourth horizontal connecting wall 39.

External lateral walls 27 comprise an external lateral plane on sides of the end sections of the carrier 2. One or more locking ports 43 are optionally formed in the external lateral plane of wall 27 which mechanically lock a portion of an expansible material 51 to carrier 2, as further described below. Similarly one or more end locking features 45 may optionally be formed on the bottom surface of carrier 2 for similar purpose.

End section 7 of carrier 2 may also have one or more pads 47 to support crossmember 1 upon installation into its intended location and before heating. The pads 47 dispose the crossmember from the adjoining surface of the structural member in order to accommodate the subsequent expansion of the expansible material 51 upon activation and/or to lift the crossmember away from the adjoining surface of the structural member to allow a gap for electro-coating to drain. In other embodiments, without limitation, the pads may be reduced in number or omitted entirely.

In addition, end section 7 of carrier 2 may optionally include one or more adjustments, compartments, or other adaptations 49 to accommodate corresponding features of the structural member in which crossmember 1 is installed, as one example only and without limitation, bolts or other protrusions.

In some embodiments, without limitation, the external lateral walls 9 of center section 3 are configured to be closer to the center longitudinal axis of crossmember 1 than the external lateral walls 27 of each end section. In such a configuration, center section 3 comprises a laterally notched section of crossmember 1 that can act as a locator and/or grip for a manual or automated tool, such as a robot, for installation of crossmember 1 into a corresponding structural member.

Center section 3 acts as a reinforcing truss that connects end sections 5 and 7, which are substantially similar in this disclosed embodiment. The external walls and ribs that run longitudinally within the crossmember add strength and energy-absorbing capacity in order to improve crashworthiness of the structural member in which the crossmember is installed. For example, a crossmember installed in a cross-sectional structural member on the floor pan of a motor vehicle will absorb force from side crash impact in a motor vehicle collision. These characteristics are enhanced by the cross walls and horizontal connecting walls that further join the external walls and internal ribs.

Each integrated reinforcing crossmember 1 is designed in shape and size to fit a particular cavity having a similar shape and size within a structural member. The size and design of the carrier 2 is generally dictated by size and shape of the cavity of the structural member into which the crossmember 1 is to be inserted. For example, in the embodiment of FIGS. 1 and 2, portions of end section 5 and 7 are arcuate, serpentine, or modified "S"-shaped in order to generally fit the hollow cavity and hump of a floor pan of a motor vehicle. Moreover, in some embodiments, any of the end walls and/or external lateral walls may be angled or canted in order to accommodate to the shape of the structural member. As one example, only in the embodiment shown in FIG. 1, the end walls of end sections 5 and 7 are angled outwardly from bottom to top at about 3 degrees, and the external lateral walls 21 of the end sections are angled outwardly from bottom to top at about 10-15 degrees in order to accommodate the shape of the corresponding structural member into which crossmember 1 is to be installed. The carrier 2 is generally adapted to fill the majority of the cavity, while the expansible material 51 is adapted to expand and seal the interface between the carrier 2 and the adjoining edges of the structural member that define the cavity.

As one example only, in a motor vehicle application, the carrier 2 is preferably formed as a unitary piece of a moldable material having a melting point that is higher than both the activation temperature of the expansible material 51 and the bake temperature to which the vehicle body and its structural members are to be exposed during manufacture. Preferably, the temperature at which the material of the carrier 2 softens is also above the bake temperature. Thus, the carrier 2 is able to substantially maintain its shape before, during and after the baking operation, so that the expansible material 51 expands to tightly fill a portion of the structural member, as some examples only, a pillar, rocker panel, or frame member.

The carrier 2 may be made of a variety of conventional materials, with the only main consideration being the activation conditions for the expansible material 51. The shape of the carrier 2 should remain substantially unchanged in response to the stimulus used to activate the expansible material 51. When using a heat-activated material, the carrier should not melt at temperatures used in the chosen heat source. For one example only, one common method of activating heat-activated materials is to allow the elevated temperatures applied to a motor vehicle during the coating and/or painting processes to cause the heat activated material to expand, thereby creating a seal within the cavity. When used in automotive structural members, the carrier 2 should be made of a material capable of withstanding the elevated temperatures associated with the coating, painting, and/or drying steps of the automobile manufacturing process, which is typically used to activate the heat expansible material.

While the carrier 2 can be made from a variety of materials (including metals), it is preferred that the carrier 2 is manufactured from plastic due to the reduced weight and lower force required to install the carrier into an opening. Nylon is a preferred material for manufacturing carriers 2, although any other suitable material may be used depending upon the desired physical characteristics thereof.

Without limitation to only the embodiment disclosed and without disclaiming any other embodiments, integrated reinforcing crossmember 1 is comprised of a carrier 2 on which an expansible material 51 is disposed. As shown in FIGS. 1-9, in some embodiments, an expansible material 51 is disposed on at least a portion of the external lateral planes of external side walls 27. Expansible material 51 is entrained in the locking ports 43 and/or locking features 45, when provided, and the material 51 expands when activated to contact a surface within the cavity of a structural member in which the crossmember 1 is disposed.

The expansible material 51 can be any suitable material that expands upon being activated. In some embodiments, without limitation, the expansible material 51 is molded onto the carrier 2 as a semi-rigid component adapted to fit predetermined areas on the carrier 2 and may be disposed on any surface of the carrier 2. The expansible material 51 may be disposed on the carrier at any location and to any extent selected by the user. In the embodiments of FIGS. 1-9, without limitation, expansible material 51 is disposed on at least a portion of the exterior lateral surface of walls 27 of end sections 5 and 7 and on at least a portion of third horizontal connecting walls 37 so that the material 51 contacts the adjoining surfaces of the structural member when activated.

The expansible material 51 is molded to the carrier 2 according to methods known to those of ordinary skill. Known methods of manufacture involve specifically molding the material 51 into a rigid component whose shape matches that of its corresponding desired position on carrier 2. In some embodiments, without limitation, the material 51 is applied to the carrier 2 in its pre-activation, flowable state and is molded to the carrier 2 during manufacture of the crossmember 1. The material 51 is applied to the carrier 2 by injecting and/or pressing the material into a mold (not shown) containing the pre-formed carrier 2. For each carrier shape or design, a set of corresponding molds for the expansible material 51 must be created. A preselected thickness of expansible material 51 is molded over the carrier 2 at predetermined locations. The original thickness and other properties of the expansible material 51, such as coefficient of expansion and baking temperature, are determined according to methods known to those of ordinary skill in order to provide a desired thickness after expansion of material 51.

As shown in FIGS. 3 and 5, in some embodiments, without limitation, when applied to the carrier 2 during the molding process, the expansible material 51 is directed and flows downwardly through the fourth horizontal connecting wall 39 through slots (not shown) generally at position 53. The material 51 flows into the slots so that a portion of the material 51 is disposed on at least portions of the external and bottom surfaces, respectively, of external lateral walls 27 and third horizontal connecting wall 37. In some embodiments, the molding process produces one or more expansible material pads 55 disposed on the top surface of fourth horizontal connecting wall 39. The pads 55 further lock the material 51 in place on the carrier 2 and also secure the crossmember 1 in the cavity of structural member when the material 51 is activated. One of ordinary skill will understand that the carrier 2 may be configured with features, as only some examples, ridges, adjustments, and similar features to contain, accommodate, and/or direct the flow of the material during molding. As one example only, without limitation, second center rib 33 and/or supporting ribs 41 may be adapted generally at area 57 (FIG. 5) to accommodate one or more pass-throughs 56 so that material 51 may flow through the carrier and reach desired locations on the end sections of the carrier. Also, during the molding process, expansible material 51 may be directed into locking ports 43 and/or locking features 45 so that the material 51 is captured by those features, further locking the material in place on the carrier.

Without limiting the possible embodiments, the expansible material 51 may be any suitable thermally expansible material. Such materials are known to those of ordinary skill in the art for structural reinforcement purposes and for other purposes, including without limitation, sound deadening (baffling) purposes. When used in an automotive application, one necessary characteristic of the expansible material 51 is that it should possess an activation temperature lower than or equal to the temperature at which the automobile body is baked during manufacture. For example, it is conventional to employ a bake temperature of about 177 degrees C. (350 degrees F.) in the manufacture of automobiles. Accordingly, a preferred expansible material for use in the manufacture of automobiles should possess an activation temperature lower than this value, e.g. 149 degrees C. (300 degrees F.).

Expansible material 51 can comprise a variety of expansible materials, but it is preferably one that expands upon activation, such as in response to a change in temperature or an introduction of a chemical compound. In one embodiment, without limitation, the expansible material is a heat-expansible foaming material; however, any material that expands upon activation and that is flowable prior to being molded is a suitable expansible material. That is, prior to being expanded, the expansible material 51 should have a viscosity that is sufficiently low to allow the material to flow into a mold and allow the expansible material 51 to take on various shapes defined by the carrier 2. In some embodiments, the viscosity of the pre-activation expansible material 51 should be sufficiently high such that the expansible material remains essentially stationary once it is applied to the carrier 2. In some embodiments, the expansible material 51 is formed of a dry, initially non-tacky material that becomes tacky upon expansion so that the expansible material 51 adheres to the structural member when the structural reinforcer 1 is heated to the activation temperature at which the expansible material 51 expands.

Any expansible material may be employed provided that it is able to expand sufficiently upon activation to seal the hollow cavity of the structural member within which the crossmember reinforcer 1 is positioned. As some examples only, a series of suitable expansible reinforcer materials are described in the U.S. Pat. No. 6,387,470, incorporated herein by reference in its entirety. Such material is marketed by Sika Corporation of Lyndhurst, N.J. A preferred expansible material is commercially available from Sika Corporation under the mark SikaReinforcer®.

By way of one example only, without limitation, expansible materials 51 can provide structural reinforcement to structural members in motor vehicles. An integrated reinforcing crossmember 1 comprised of a carrier 2 upon which an expansible material 51 is disposed can be placed within the cavity of an automotive structural member such as a frame rail, pillar, or other member. Then, the expansible material 51 is heated to an activation temperature, where it expands. Upon expansion, the material 51 adheres to at least a portion of the adjacent surface of the structural member. Thus, the integrated reinforcing crossmember provides reinforcement for the structural member such that the member is less easily bent, compressed or otherwise deformed.

Without limiting the invention to only disclosed embodiments, FIGS. 6-9 show an exemplary embodiment comprising a structural member of a motor vehicle. An integrated reinforcing crossmember 1 according to some embodiments is disposed within a cavity 58 of a structural member 59 of a motor vehicle, here a cross rail in the underside framing. The crossmember 1 is inserted robotically into the cavity 58 of the cross rail 59. During the manufacturing process, the cross rail 59 containing the installed crossmember 1 is submerged in a bath of electro-coating solution. Excess solution drains from the crossmember 1 through drain holes 21 (not shown in FIGS. 6-9) and along the cross rail 59, exiting via cutouts in the rail 65. A floor pan 61 is spot-welded into place above the cross rail 59. The assembly containing the crossmember 1 is then placed in a heating oven, where the electro-coating solution is baked onto the assembly, typically of about 177° C. (approximately 350° F.). During the baking process, the expansible material 51 is activated, expands, and further locates and secures the crossmember 1 in place within the rail 59. Although the crossmember 1 is described in this example in the context of a motor vehicle, it is understood that it can also be used in connection with a variety of other articles of manufacture to reinforce their structural members.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

What is claimed is:

1. An integrated reinforcing crossmember adapted for positioning within a cavity of a structural member, comprising:
    a carrier having a center section and two end sections, each end section being joined to the center section,
    the center section of the carrier having at least two external lateral walls and at least two internal ribs running generally in the direction of the longitudinal axis of the crossmember, the external lateral walls and internal ribs are intersected by a plurality of cross walls running cross-sectionally across the crossmember, each external lateral wall further joined to its most adjacent internal rib by a first horizontal connecting wall, and respective pairs of adjacent internal ribs further joined by a second horizontal connecting wall, and
    each end section of the carrier having at least two external lateral walls and at least two internal ribs running generally in the direction of the longitudinal axis of the member, the external lateral walls and internal ribs are joined by a plurality of cross walls running cross-sectionally across the crossmember, each external lateral wall further joined to its most adjacent internal rib by a third horizontal connecting wall, and respective pairs of internal ribs further joined by a fourth horizontal connecting wall,
    wherein each external lateral wall of each end section is comprised of an external lateral plane, an expansible material is disposed on at least a portion of each external lateral plane of each end section and on at least an external portion of each third horizontal connecting wall, and the expansible material expands when activated to contact a surface within the cavity of the structural member; and
    wherein the external lateral walls of the center section are configured to be closer to the center longitudinal axis of the crossmember than the external lateral walls of each end section.

2. The integrated reinforcing crossmember of claim 1, wherein one or more pads of expansible material are disposed on the top surface of the fourth horizontal wall.

3. The integrated reinforcing crossmember of claim 1, wherein each first and third horizontal wall has one or more drain holes.

4. The integrated reinforcing crossmember of claim 1, wherein the external lateral walls of each end section have a plurality of locking ports and wherein the expansible material is disposed on at least a portion of the carrier such that the material is entrained in the locking ports.

5. The integrated reinforcing crossmember of claim 1, wherein the structural member is a pillar, a panel, or a frame rail of a motor vehicle.

6. The integrated reinforcing crossmember of claim 1, further comprising one or more pass-throughs.

7. An integrated reinforcing crossmember adapted for positioning within a cavity of a structural member, comprising:
    a carrier having a center section and two end sections, each end section being joined to the center section,
    the center section of the carrier having at least two external lateral walls and at least two internal ribs running generally in the direction of the longitudinal axis of the crossmember, the external lateral walls and internal ribs are intersected by a plurality of cross walls running cross-sectionally across the crossmember, each external lateral wall further joined to its most adjacent internal rib by a first horizontal connecting wall, and respective pairs of adjacent internal ribs further joined by a second horizontal connecting wall, and
    each end section of the carrier having at least two external lateral walls and at least two internal ribs running generally in the direction of the longitudinal axis of the member, the external lateral walls and internal ribs are joined by a plurality of cross walls running cross-sectionally across the crossmember, each external lateral wall further joined to its most adjacent internal rib by a third horizontal connecting wall, and respective pairs of internal ribs further joined by a fourth horizontal connecting wall,
    wherein each external lateral wall of each end section is comprised of an external lateral plane, an expansible material is disposed on at least a portion of each external lateral plane of each end section and on at least an external portion of each third horizontal connecting wall, and the expansible material expands when activated to contact a surface within the cavity of the structural member; and
    wherein each end section is further comprised of at least one first center rib disposed between an external lateral wall and an internal rib, and at least one second center rib disposed between two internal ribs.

8. An integrated reinforcing crossmember adapted for positioning within a cavity of a structural member, comprising:
a carrier having a center section and two end sections, each end section being joined to the center section,
the center section of the carrier having at least two external lateral walls and at least two internal ribs running generally in the direction of the longitudinal axis of the crossmember, the external lateral walls and internal ribs are intersected by a plurality of cross walls running cross-sectionally across the crossmember, each external lateral wall further joined to its most adjacent internal rib by a first horizontal connecting wall, and respective pairs of adjacent internal ribs further joined by a second horizontal connecting wall, and
each end section of the carrier having at least two external lateral walls and at least two internal ribs running generally in the direction of the longitudinal axis of the member, the external lateral walls and internal ribs are joined by a plurality of cross walls running cross-sectionally across the crossmember,
wherein each external lateral wall of each end section is comprised of an external lateral plane, an expansible material is disposed on at least a portion of each external lateral plane of each end section, the expansible material expands when activated to contact a surface within the cavity of the structural member, and the external lateral walls of the center section are configured to be closer to the center longitudinal axis of the crossmember than the external lateral walls of each end section.

9. The integrated reinforcing crossmember of claim 8, further comprising one or more pass-throughs.

10. A reinforced structural member of a motor vehicle, comprising:
a structural member of a motor vehicle comprising a cavity therein, and
an integrated reinforced crossmember disposed within a cavity of the structural member, the crossmember comprised of:
a carrier having a center section and two end sections, each end section being joined to the center section,
the center section of the carrier having at least two external lateral walls and at least two internal ribs running generally in the direction of the longitudinal axis of the crossmember, the external lateral walls and internal ribs are intersected by a plurality of cross walls running cross-sectionally across the crossmember, each external lateral wall further joined to its most adjacent internal rib by a first horizontal connecting wall, and respective pairs of adjacent internal ribs further joined by a second horizontal connecting wall, and
each end section of the carrier having at least two external lateral walls and at least two internal ribs running generally in the direction of the longitudinal axis of the member, the external lateral walls and internal ribs are joined by a plurality of cross walls running cross-sectionally across the crossmember, each external lateral wall further joined to its most adjacent internal rib by a third horizontal connecting wall, and respective pairs of internal ribs further joined by a fourth horizontal connecting wall,
wherein each external lateral wall of each end section is comprised of an external lateral plane, an expansible material is disposed on at least a portion of each external lateral plane of each end section and on at least an external portion of each third horizontal connecting wall, and the expansible material expands when activated to contact a surface within the cavity of the structural member; and
wherein the external lateral walls of the center section are configured to be closer to the center longitudinal axis of the crossmember than the external lateral walls of each end section.

11. The reinforced structural member of claim 10, wherein one or more pads of expansible material are disposed on the top surface of the fourth horizontal wall.

12. The reinforced structural member of claim 10, wherein each first and third horizontal wall has one or more drain holes.

13. The reinforced structural member of claim 10, wherein the external lateral walls of each end section have a plurality of locking ports and wherein the expansible material is disposed on at least a portion of the carrier such that the material is entrained in the locking ports.

14. The reinforced structural member of claim 10, wherein the structural member is a pillar, a panel, or a frame rail of a motor vehicle.

15. The reinforced structural member of claim 10, wherein the integrated reinforcing crossmember further comprises one or more pass-throughs.

16. A reinforced structural member of a motor vehicle, comprising:
a structural member of a motor vehicle comprising a cavity therein, and
an integrated reinforced crossmember disposed within a cavity of the structural member, the crossmember comprised of:
a carrier having a center section and two end sections, each end section being joined to the center section,
the center section of the carrier having at least two external lateral walls and at least two internal ribs running generally in the direction of the longitudinal axis of the crossmember, the external lateral walls and internal ribs are intersected by a plurality of cross walls running cross-sectionally across the crossmember, each external lateral wall further joined to its most adjacent internal rib by a first horizontal connecting wall, and respective pairs of adjacent internal ribs further joined by a second horizontal connecting wall, and
each end section of the carrier having at least two external lateral walls and at least two internal ribs running generally in the direction of the longitudinal axis of the member, the external lateral walls and internal ribs are joined by a plurality of cross walls running cross-sectionally across the crossmember, each external lateral wall further joined to its most adjacent internal rib by a third horizontal connecting wall, and respective pairs of internal ribs further joined by a fourth horizontal connecting wall,
wherein each external lateral wall of each end section is comprised of an external lateral plane, an expansible material is disposed on at least a portion of each external lateral plane of each end section and on at least an external portion of each third horizontal connecting wall, and the expansible material expands when activated to contact a surface within the cavity of the structural member; and
wherein each end section is further comprised of at least one first center rib disposed between an external lateral wall and an internal rib, and at least one second center rib disposed between two internal ribs.

17. A reinforced structural member of a motor vehicle, comprising:

a structural member of a motor vehicle comprising a cavity therein, and an integrated reinforcing crossmember adapted for positioning within a cavity of the structural member, the crossmember comprised of:

a carrier having a center section and two end sections, each end section being joined to the center section, the center section of the carrier having at least two external lateral walls and at least two internal ribs running generally in the direction of the longitudinal axis of the crossmember, the external lateral walls and internal ribs are intersected by a plurality of cross walls running cross-sectionally across the crossmember, each external lateral wall further joined to its most adjacent internal rib by a first horizontal connecting wall, and respective pairs of adjacent internal ribs further joined by a second horizontal connecting wall, and each end section of the carrier having at least two external lateral walls and at least two internal ribs running generally in the direction of the longitudinal axis of the member, the external lateral walls and internal ribs are joined by a plurality of cross walls running cross-sectionally across the crossmember, wherein each external lateral wall of each end section is comprised of an external lateral plane, an expansible material is disposed on at least a portion of each external lateral plane of each end section, the expansible material expands when activated to contact a surface within the cavity of the structural member, and the external lateral walls of the center section are configured to be closer to the center longitudinal axis of the crossmember than the external lateral walls of each end section.

18. The reinforced structural member of claim 17, wherein the integrated reinforcing crossmember further comprises one or more pass-throughs.

\* \* \* \* \*